(12) United States Patent
Jordan et al.

(10) Patent No.: US 7,623,552 B2
(45) Date of Patent: Nov. 24, 2009

(54) SYSTEM AND METHOD FOR TIME SYNCHRONIZING NODES IN AN AUTOMOTIVE NETWORK USING INPUT CAPTURE

(75) Inventors: Patrick D. Jordan, Austin, TX (US); Hai Dong, Austin, TX (US); Hugh W. Johnson, Cedar Park, TX (US); Prakash U. Kartha, Round Rock, TX (US)

(73) Assignee: Temic Automotive of North America, Inc., Deer Park, IL (US)

( * ) Notice: Subject to any disclaimer, the term of this patent is extended or adjusted under 35 U.S.C. 154(b) by 315 days.

(21) Appl. No.: 11/016,139

(22) Filed: Dec. 17, 2004

(65) Prior Publication Data

US 2006/0083265 A1    Apr. 20, 2006

Related U.S. Application Data

(60) Provisional application No. 60/618,769, filed on Oct. 14, 2004, provisional application No. 60/618,768, filed on Oct. 14, 2004.

(51) Int. Cl.
*H04J 3/06* (2006.01)
(52) U.S. Cl. .................................... 370/503; 370/516
(58) Field of Classification Search ................ 370/359, 370/503, 509, 510, 511, 512, 513, 514, 516; 375/354, 356, 364–366, 371
See application file for complete search history.

(56) References Cited

U.S. PATENT DOCUMENTS

| | | |
|---|---|---|
| 4,816,989 A | 3/1989 | Finn et al. |
| 5,151,899 A | 9/1992 | Thomas et al. |
| 5,195,091 A | 3/1993 | Farwell et al. |
| 5,321,689 A | 6/1994 | Suzuki et al. |
| 5,566,180 A | 10/1996 | Eidson et al. |
| 5,612,953 A | 3/1997 | Olnowich |
| 5,802,052 A | 9/1998 | Venkataraman |
| 6,356,823 B1 | 3/2002 | Iannotti et al. |

(Continued)

OTHER PUBLICATIONS

International Search Report and Written Opinion from International Application No. PCT/US05/34865, dated Jun. 20, 2006.

(Continued)

*Primary Examiner*—Ajit Patel

(57) ABSTRACT

A system and method for time synchronizing nodes in a switch fabric network of a vehicle. A synchronization request message is transmitted from a requesting node to a neighboring node. At the time the synchronization request message is sent, the requesting node will store a unique message identification associated with the request message as well as a first timestamp that is associated with the time that the synchronization request message was transmitted by the requesting node. The neighboring node will receive the synchronization request message and store a second timestamp associated with the time that the synchronization request message was received by the neighboring node. Thereafter, the neighboring node will transmit to the requesting node a synchronization response message that includes the message identification and the second timestamp. The requesting node will then calculate a timer offset value that is based on the first timestamp and the second timestamp. The timer offset values may then be shared with other nodes in the network so that a summed offset may be used to transmit network messages across a plurality of nodes.

22 Claims, 5 Drawing Sheets

U.S. PATENT DOCUMENTS

| | | | |
|---|---|---|---|
| 6,373,834 B1 | 4/2002 | Lundh et al. | |
| 6,420,797 B1 | 7/2002 | Steele et al. | |
| 6,430,164 B1 | 8/2002 | Jones et al. | |
| 6,477,453 B2 | 11/2002 | Oi et al. | |
| 6,559,783 B1 | 5/2003 | Stoneking | |
| 6,611,519 B1 | 8/2003 | Howe | |
| 6,611,537 B1 | 8/2003 | Edens et al. | |
| 6,643,465 B1 | 11/2003 | Bösinger et al. | |
| 6,732,031 B1 | 5/2004 | Lightner et al. | |
| 6,747,365 B2 | 6/2004 | Reinold | |
| 6,757,521 B1 | 6/2004 | Ying | |
| 6,845,416 B1 | 1/2005 | Chasmawala et al. | |
| 7,027,773 B1* | 4/2006 | McMillin | 455/41.2 |
| 7,210,063 B2 | 4/2007 | Holcroft et al. | |
| 7,272,496 B2 | 9/2007 | Remboski et al. | |
| 2002/0077739 A1 | 6/2002 | Augsburger et al. | |
| 2002/0080829 A1 | 6/2002 | Ofek et al. | |
| 2002/0087891 A1 | 7/2002 | Little et al. | |
| 2003/0043739 A1 | 3/2003 | Reinold et al. | |
| 2003/0043750 A1 | 3/2003 | Remboski et al. | |
| 2003/0043779 A1 | 3/2003 | Remboski et al. | |
| 2003/0043793 A1 | 3/2003 | Reinold et al. | |
| 2003/0043799 A1 | 3/2003 | Reinold et al. | |
| 2003/0043824 A1 | 3/2003 | Remboski et al. | |
| 2003/0045234 A1 | 3/2003 | Remboski et al. | |
| 2003/0045971 A1 | 3/2003 | Reinold et al. | |
| 2003/0045972 A1 | 3/2003 | Remboski et al. | |
| 2003/0046327 A1 | 3/2003 | Reinold et al. | |
| 2003/0051131 A1 | 3/2003 | Reinold et al. | |
| 2003/0065630 A1 | 4/2003 | Brown et al. | |
| 2003/0091035 A1 | 5/2003 | Roy et al. | |
| 2003/0185201 A1 | 10/2003 | Dorgan | |
| 2003/0188303 A1 | 10/2003 | Barman et al. | |
| 2004/0001593 A1 | 1/2004 | Reinold et al. | |
| 2004/0002799 A1 | 1/2004 | Dabbish et al. | |
| 2004/0003227 A1 | 1/2004 | Reinold et al. | |
| 2004/0003228 A1 | 1/2004 | Fehr et al. | |
| 2004/0003229 A1 | 1/2004 | Reinold et al. | |
| 2004/0003230 A1 | 1/2004 | Puhl et al. | |
| 2004/0003231 A1 | 1/2004 | Levenson et al. | |
| 2004/0003232 A1 | 1/2004 | Levenson et al. | |
| 2004/0003233 A1 | 1/2004 | Reinold et al. | |
| 2004/0003234 A1 | 1/2004 | Reinold et al. | |
| 2004/0003237 A1 | 1/2004 | Puhl et al. | |
| 2004/0003242 A1 | 1/2004 | Fehr et al. | |
| 2004/0003243 A1 | 1/2004 | Fehr et al. | |
| 2004/0003245 A1 | 1/2004 | Dabbish et al. | |
| 2004/0003249 A1 | 1/2004 | Dabbish et al. | |
| 2004/0003252 A1 | 1/2004 | Dabbish et al. | |
| 2004/0042469 A1 | 3/2004 | Clark et al. | |
| 2004/0131014 A1 | 7/2004 | Thompson, III et al. | |
| 2004/0148460 A1 | 7/2004 | Steinmetz et al. | |
| 2004/0213295 A1 | 10/2004 | Fehr | |
| 2004/0227402 A1 | 11/2004 | Fehr et al. | |
| 2004/0254700 A1 | 12/2004 | Fehr et al. | |
| 2004/0258001 A1 | 12/2004 | Remboski et al. | |
| 2005/0004727 A1 | 1/2005 | Remboski et al. | |
| 2005/0038583 A1 | 2/2005 | Fehr et al. | |
| 2005/0160285 A1 | 7/2005 | Evans | |
| 2005/0251604 A1 | 11/2005 | Gerig | |
| 2005/0251608 A1 | 11/2005 | Fehr et al. | |
| 2006/0013263 A1* | 1/2006 | Fellman | 370/503 |
| 2006/0013565 A1* | 1/2006 | Baumgartner | 386/96 |
| 2006/0020717 A1 | 1/2006 | Remboski et al. | |
| 2006/0083172 A1 | 4/2006 | Jordan et al. | |
| 2006/0083173 A1 | 4/2006 | Jordan et al. | |
| 2006/0083229 A1 | 4/2006 | Jordan et al. | |
| 2006/0083250 A1 | 4/2006 | Jordan et al. | |
| 2006/0083264 A1 | 4/2006 | Jordan et al. | |
| 2006/0282549 A1 | 12/2006 | Vinnemann | |

OTHER PUBLICATIONS

D. John Oliver, Intel Corporation, "Implementing the J1850 Protocol", 15 pages, available from the Internet at http://developer.intel.com/design/intarch/papers/j1850_wp.pdf (per Internet Archive Wayback Machine) Sep. 2000.

"Controller Area Network (CAN)—Protocol", copyright 2003 by CAN in Automation (CiA), 5 pages, available from the Internet at http://www.can-cia.org/can/protocol/ (per Internet Archive Wayback Machine) May 2004.

* cited by examiner

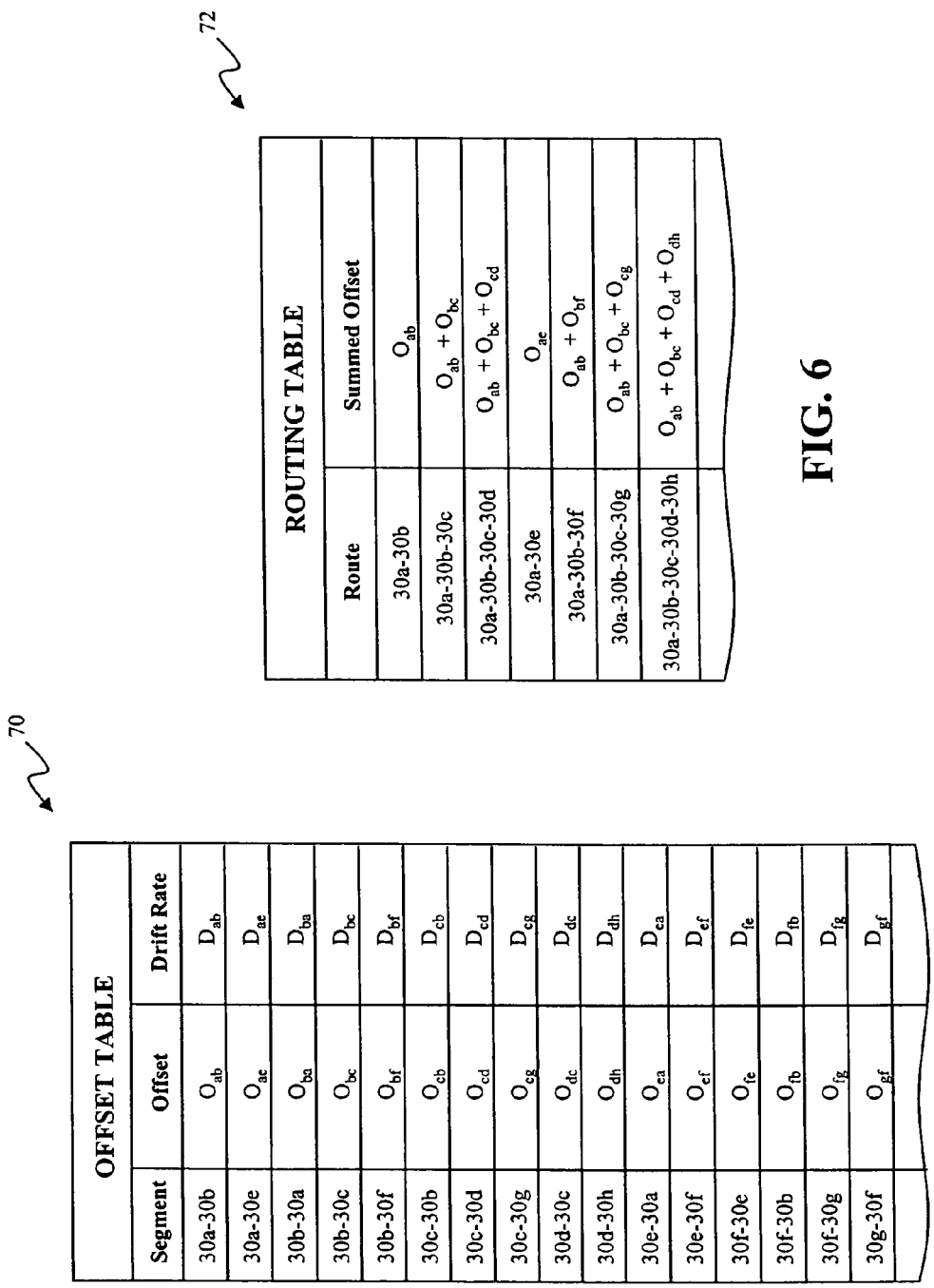

SYSTEM AND METHOD FOR TIME SYNCHRONIZING NODES IN AN AUTOMOTIVE NETWORK USING INPUT CAPTURE

The present application claims priority from provisional application, Ser. No. 60/618,769, entitled "System and Method for Time Synchronizing Nodes in an Automotive Network," filed Oct. 14, 2004, which is commonly owned and incorporated herein by reference in its entirety.

The present application is related to provisional application, Ser. No. 60/618,768, entitled "System and Method for Time Synchronizing Nodes in an Automotive Network Using Input Capture," filed Oct. 14, 2004, which is commonly owned and incorporated herein by reference in its entirety.

FIELD OF THE INVENTION

This invention in general relates to in-vehicle communication networks and particularly to a system and method for synchronizing nodes in an in-vehicle network.

BACKGROUND OF THE INVENTION

The commonly assigned U.S. patent application entitled "Vehicle Active Network," Ser. No. 09/945,581, Publication Number US 20030043793, filed Aug. 31, 2001, the disclosure of which is hereby expressly incorporated herein by reference, introduces the concept of an active network that includes a switch fabric. The switch fabric is a web of interconnected switching devices or nodes. Control devices, sensors, actuators and the like are coupled to the switch fabric, and the switch fabric facilitates communication between these coupled devices.

The coupled devices may be indicator lights, vehicle control systems, vehicle safety systems, and comfort and convenience systems. A command to actuate a device or devices may be generated by a control element coupled to the switch fabric and is communicated to the device or devices via the switch fabric. The command may require simultaneous activation of two or more devices. However, the switch fabric may be a packet based communication medium making coordinating simultaneous events difficult.

To illustrate this difficulty take for example the need to capture data from multiple sensors at the same time. For example, it may be necessary to communicate various control parameters from a number of engine sensors to an engine controller so that it may then issue commands for the control of the engine. For example, to detect misfire, the engine controller receives data from several oxygen sensors, the crankshaft position sensor and potentially other sensors. To be certain that the misfire is detected for the correct engine cylinder so that control parameters may be varied to correct the misfire, the data must arrive to the engine controller in a coordinated manner or have a reliable time indication. Unless each of the sensors are time synchronized, there is no way to accurately time stamp the data packets or to effectively communicate them to the engine controller in a coordinated manner.

Another problem may involve the need for multiple devices to be activated at the same time or at a predefined time in the future. For example, there is a need to illuminate the left, right and center high-mounted brake lights on an automobile. Each of the brake lights should appear to illuminate substantially simultaneously. Each of the lights is coupled to the switch fabric. The command to illuminate the lights may be generated by a braking control module, which is also coupled to the switch fabric. The command is communicated from the braking control module to the three brake lights. However, the command may take different incremental amounts of time based upon the paths the command takes through the network to arrive at each of the three brake lights. If the brake lights act on the command when received, the lights may not appear to come on simultaneously. The command may give a time at which to activate, but if each of the brake lights are not time synchronized, they still will not actuate at the same coordinated time.

It is, therefore, desirable to provide a system and method to overcome or minimize most, if not all, of the preceding problems especially in the area of synchronizing elements of an in-vehicle network.

BRIEF DESCRIPTION OF THE DRAWINGS

FIG. 5 is a graphic illustration of an offset table that may be stored in a node of the vehicle active network;

FIG. 6 is a graphic illustration of a routing table that may be stored in a node of the vehicle active network.

Figure 1:
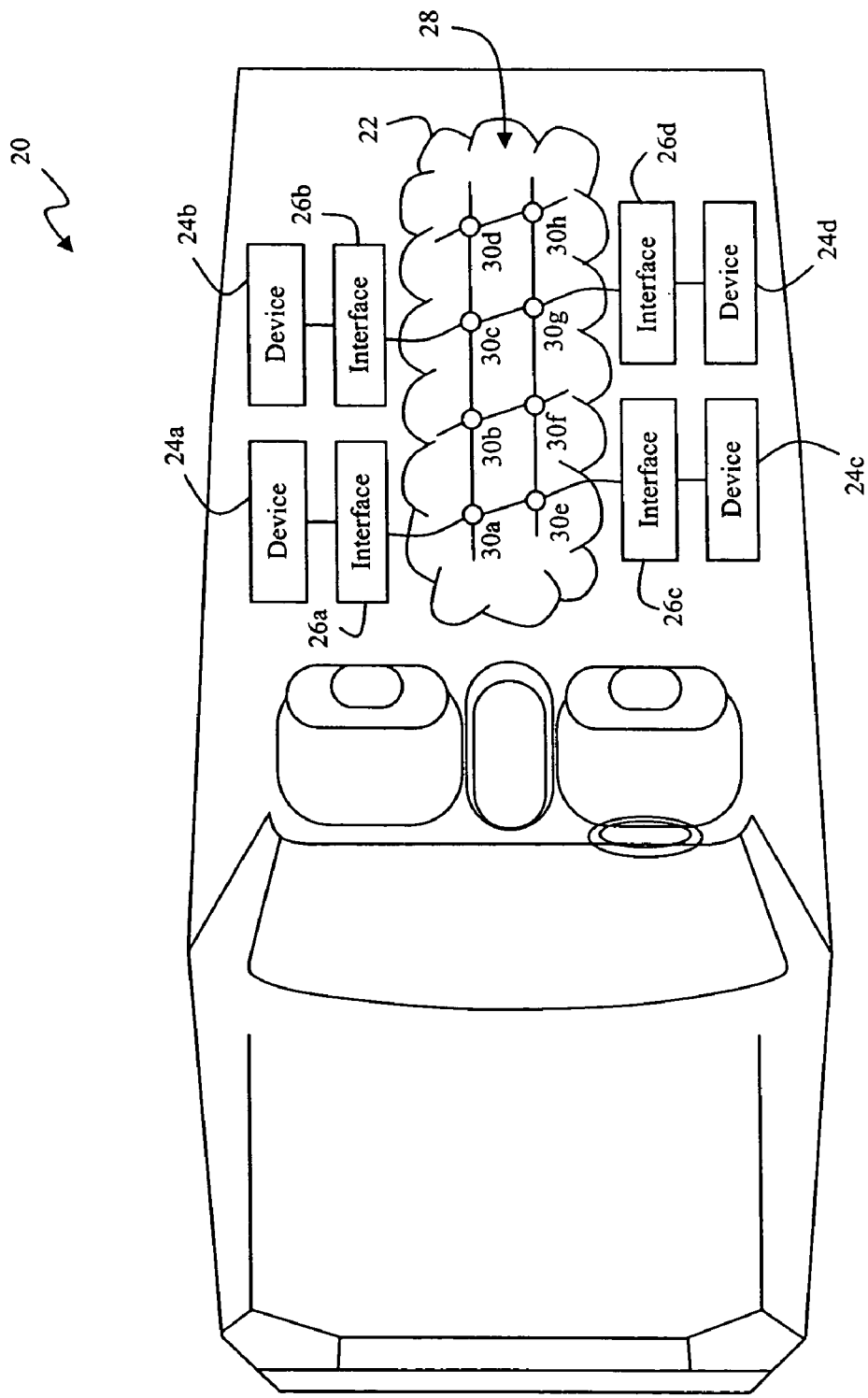
FIG. 1 is a block diagram illustrating an embodiment of a vehicle active network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for time synchronizing nodes in a switch fabric network of a vehicle. A synchronization request message is transmitted from a requesting node to a neighboring node. At the time the synchronization request message is sent, the requesting node will store a unique message identification associated with the request message as well as a first timestamp that is associated with the time that the synchronization request message was transmitted by the requesting node. The neighboring node will receive the synchronization request message and store a second timestamp associated with the time that the synchronization request message was received by the neighboring node. Thereafter, the neighboring node will transmit to the requesting node a synchronization response message that includes the message identification and the second timestamp. The requesting node will then calculate a timer offset value that is based on the first timestamp and the second timestamp. The timer offset values may then be shared with other nodes in the network so that a summed offset may be used to transmit network messages across a plurality of nodes.

Now, turning to the drawings, FIG. 1 illustrates a vehicle 20 including a network 22 to which various vehicle devices 24*a-d* are coupled via respective interfaces 26*a-d*. The vehicle devices 24*a-d* may be sensors, actuators, and processors used in connection with various vehicle functional systems and sub-systems, such as, but not limited to, diagnostics, control-by-wire applications for throttle, braking and steering control, adaptive suspension, power accessory control, communications, entertainment, and the like.

The interfaces 26a-d are any suitable interface for coupling the particular vehicle device 24a-d to the network 22, and may be wire, optical, wireless or combinations thereof. The vehicle device 24a-d is particularly adapted to provide one or more functions associated with the vehicle 20. These vehicle devices 24a-d may be data producing, such as a sensor, data consuming, such as an actuator, or processing, which both produces and consumes data. Of course, an actuator, typically a data-consuming device, may also produce data, for example where the actuator produces data indicating it has achieved the instructed state, or a sensor may consume data, for example, where it is provided instructions for the manner of function. Data produced by or provided to a vehicle device 24a-d, and carried by the network 22, is independent of the function of the vehicle device 24a-d itself. That is, the interfaces 26a-d provide device independent data exchange between the coupled device 24a-d and the network 22.

The network 22 may include a switch fabric 28 defining a plurality of communication paths between the vehicle devices 24a-d. The communication paths permit multiple simultaneous peer-to-peer, one-to-many, many-to-many, etc. communications between the vehicle devices 24a-d. During operation of the vehicle 20, data exchanged, for example, between devices 24a and 24d may utilize any available path or paths between the vehicle devices 24a, 24d. In operation, a single path through the switch fabric 28 may carry all of a single data communication between one vehicle device 24a and another vehicle device 24d, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path. Moreover, communications between other of the devices 24b, 24c may occur simultaneously using the communication paths within the switch fabric 28.

The network 22 may comply with transmission control protocol/Internet (TCP/IP), asynchronous transfer mode (ATM), Infiniband, RapidIO, or other packet data protocols. As such, the network 22 utilizes data packets, having fixed or variable length, defined by the applicable protocol. For example, if the network 22 uses asynchronous transfer mode (ATM) communication protocol, ATM standard data cells are used.

The vehicle devices 24a-d need not be discrete devices. Instead, the devices may be systems or subsystems of the vehicle and may include one or more legacy communication media, i.e., legacy bus architectures such as the Controller Area Network (CAN) protocol, the SAE J1850 Communications Standard, the Local Interconnect Network (LIN) protocol, the FLEXRAY Communications System Standard, the Media Oriented Systems Transport or MOST Protocol, or similar bus structures. In such embodiments, the respective interface 26a-d may be configured as a proxy or gateway to permit communication between the network 22 and the legacy device.

Figure 2:
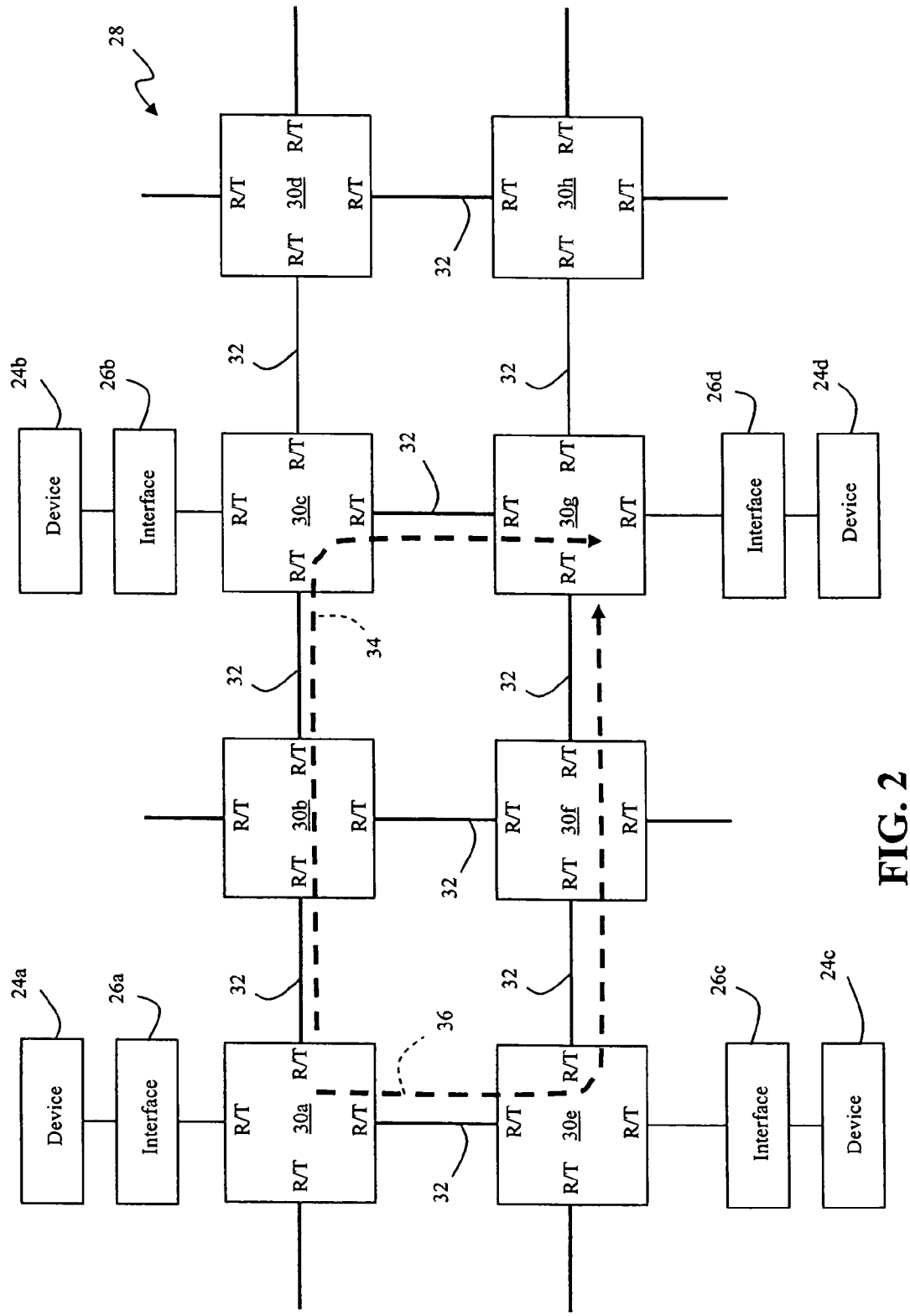
FIG. 2 is a graphic illustration of an embodiment of a vehicle switch fabric network according to the invention.

Referring to FIG. 2, an active network 22 in accordance with one embodiment of the present invention includes a switch fabric 28 of nodes 30a-h that communicatively couple a plurality of devices 24a-d via respective interfaces 26a-d. Connection media 32 interconnects the nodes 30a-h. The connection media 32 may be bounded media, such as wire or optical fiber, unbounded media, such as free optical or radio frequency, or combinations thereof. In addition, the term node is used broadly in connection with the definition of the switch fabric 28 to include any number of intelligent structures for communicating data packets within the network 22 without an arbiter or other network controller and may include: switches, intelligent switches, routers, bridges, gateways and the like. Data is thus carried through the network 22 in data packet form guided by the nodes 30a-h.

The cooperation of the nodes 30a-h and the connection media 32 define a plurality of communication paths between the devices 24a-d that are communicatively coupled to the network 22. For example, a route 34 defines a communication path from device 24a to device 24d. If there is a disruption along the route 34 inhibiting communication of the data packets from the device 24a to the device 24d, for example, if one or more nodes are at capacity or have become disabled or there is a disruption in the connection media joining the nodes along route 34, a new route, illustrated as route 36, can be used. The route 36 may be dynamically generated or previously defined as a possible communication path, to ensure the communication between device 24a and device 24d.

Figure 3:
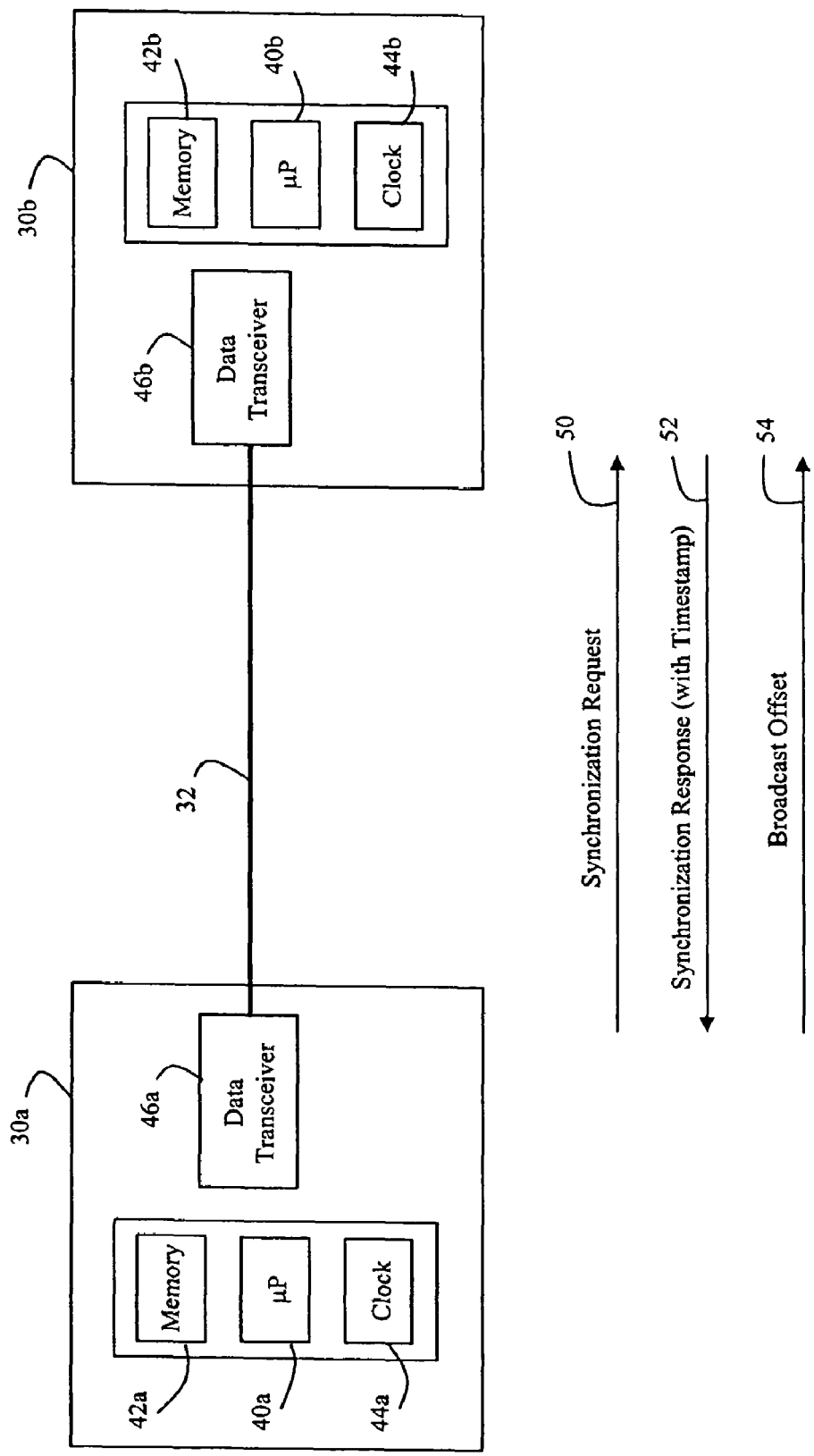
FIG. 3 is a graphic illustration of a portion of the vehicle active network illustrating the exchange of messages between two nodes.

Some applications may require synchronized activity between multiple elements of the network or devices connected to the network. This synchronized activity requires timing information be available within the network 22. FIG. 3 illustrates a portion of the network 22 that includes a switch fabric 28 of nodes, including a first node 30a and a second node 30b. Connection media 32 interconnects the first node 30a to the second node 30b.

As shown in FIG. 3, in one embodiment, the first node 30a and the second node 30b may include a microprocessor 40a,b, a memory 42a,b, a clock 44a,b, and a data transceiver 46a,b to transmit and send data. The microprocessor 40a,b includes a suitable control program for effecting the operation of the node 30a,b for coupling inputs and outputs in order to transmit data within the network 22. Moreover, the microprocessor 40a,b may be configured to effect the operation of the timestamp of the transmission and reception of synchronization messages, as will be explained in further detail below.

FIG. 3 also illustrates, at a high level, one embodiment of the present invention for generating and providing synchronization information within the network 22. The process begins by the first node 30a transmitting a synchronization request message to the second node 30b (arrow 50). The synchronization request message may be sent on a predetermined, periodic basis. The synchronization request message may include a variety of field including an identification of the sending node and a message identification. The second node 30b will respond with a synchronization response message that includes a timestamp that represents the time when the synchronization request message was received by the second node 30b(arrow 52). The first node 30a will then calculate a timer offset value between the two nodes and store the offset value in an offset table or database. Later, the first node 30a may broadcast the timer offset values that it has calculated with the second node 30b (and any other neighboring nodes) to the entire network 22 (arrow 54).

Figure 4:
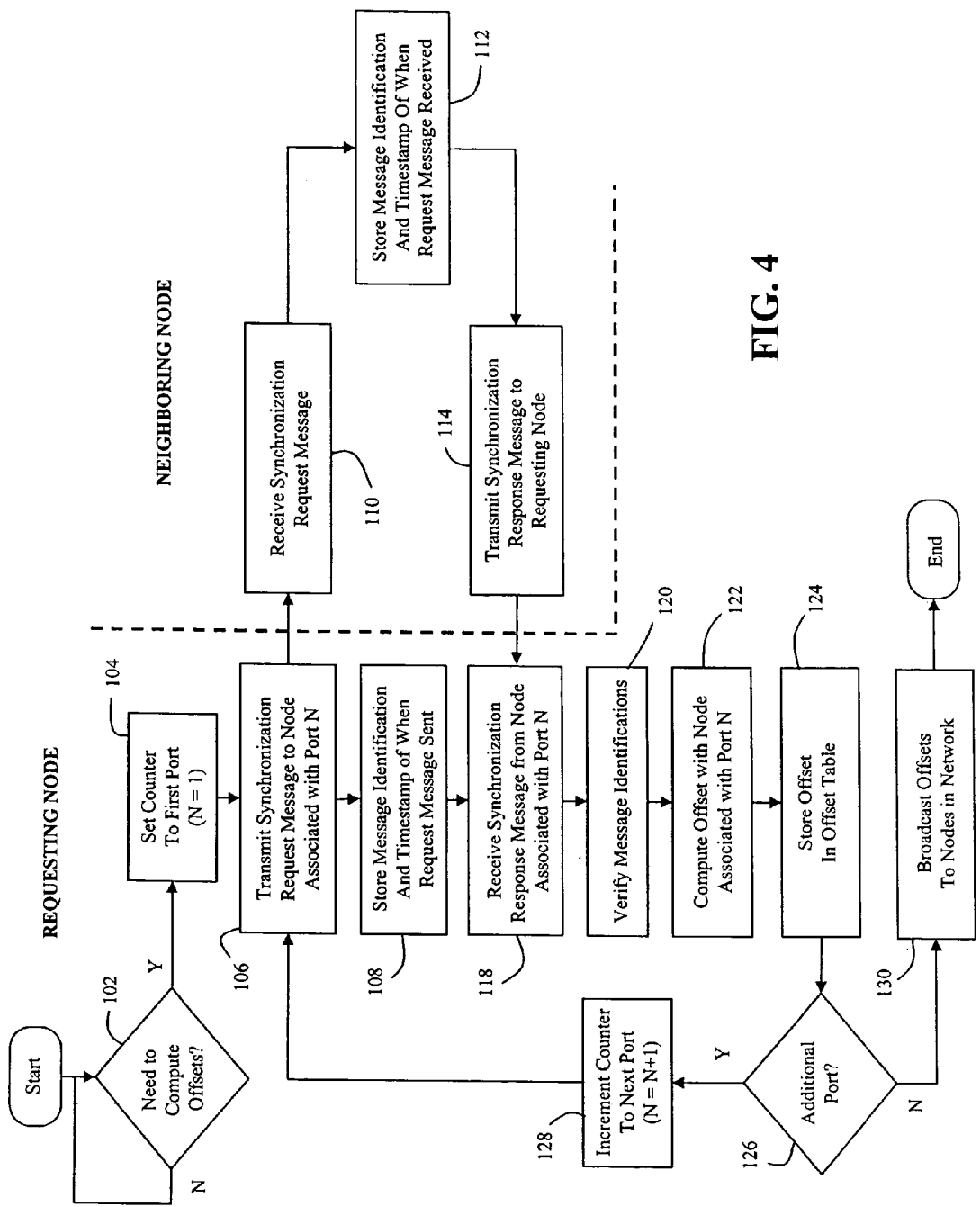
FIG. 4 is a flow diagram illustrating one embodiment of a synchronization process between two nodes.

FIG. 4 further explains, at a more detailed level, one embodiment of the present invention for providing synchronization information within the network 22. Synchronization in this case is a process used by the nodes to calculate the relative clock offset between themselves and other neighboring nodes in the network 22. The flow diagrams in FIG. 4 contain further descriptions of one embodiment for implementing the functions to calculate neighboring offsets by a node. For purposes of illustration, these diagrams represent a synchronization dialogue between the requesting node (such as node 30*a*) and any immediate neighboring nodes (such as nodes 30*b*, 30*e*).

Referring to FIG. 4, the requesting node (the node that desires to initiate synchronization messages) may be configured to compute offsets with any neighboring nodes on a predetermined, periodic basis. In decision block 102, if the requesting node needs to compute offsets with its neighboring nodes, the process will continue to process block 104. Otherwise, the process will remain at decision block 102.

In one embodiment, at the beginning of a synchronization process, the requesting node may set a counter so that it can compute offsets with each connecting neighboring node. As shown in FIG. 2, each node may have one or more input/output data ports that connect the node's data transceiver to the communication link 32 for the transmission and reception of data message with another neighboring node. For instance, FIG. 2 illustrates that the node 30*a* is connected to neighboring nodes 30*b* and 30*e* via different communication links 32. Referring back to FIG. 4, in one embodiment, the process includes setting the counter to a first port of the requesting node (N=1). The process then continues to block 106 where the requesting node will transmit a synchronization request message with the node associated with the first port. As mentioned above, the synchronization request message may include a variety of fields such as an identification of the sending node and a message identification. After the transmission of the synchronization request message, in block 108, the requesting node will store a value of a timestamp from its clock in memory that represents the time that the synchronization request message was sent to the neighboring node.

At process block 110, the neighboring node will receive the synchronization request message from the requesting node. When the neighboring node receives the synchronization request message, in block 112, the neighboring node will store the message identification of the synchronization request message and a value of a timestamp from its clock in memory that represent the time that the synchronization request message was received at the neighboring node. After storing the message identification and timestamp value, the neighboring node will then transmit a synchronization response message back to the requesting node as shown in process block 114. The synchronization response message may include fields such as the message identification in the synchronization request message and the timestamp value associated with the time that the request message was received at the neighboring node.

As illustrated in process block 118, the requesting node will receive the synchronization response message from the neighboring node. When the requesting node receives the synchronization response message, the requesting node may then perform a series of tasks including verifying the message identification, computing an offset value, and storing the offset value in an offset table in its memory. In block 120, the requesting node will compare the message identification in the synchronization response message (received from the neighboring node) with the message identification in the synchronization request message (transmitted to the neighboring node). If they match, the process continues to process block 122. The additional benefit of the present invention is that if the message identifications are different, or if the requesting node does not receive a synchronization response message back from the neighboring node, then the requesting node may further initiate a series of steps to see if there is a failure in the link between the requesting node and the neighboring node.

At block 122, the requesting node may compute the offset value based on the difference in time between the timestamp associated with the time that the reference synchronization message left the requesting node (stored in the requesting node's memory) and the timestamp associated with the time that the reference synchronization message was received by the neighboring node (retrieved from the synchronization response message transmitted by the neighboring node). The requesting node may then store the computed offset in an offset table in its memory as illustrated in block 124.

In a further embodiment, the requesting node may then proceed to do a similar process with any other immediate neighboring nodes. Accordingly, in decision block 126, a determination is made whether additional input/output data ports exist on the requesting node that are connected to other neighboring nodes. If so, at process block 128, the process may increment a counter to step through the next input/output data port on the requesting node. The process continues back to block 106 where a new synchronization request message is transmitted to the next neighboring node. This will result in another computed offset that is stored in memory.

Referring back to decision block 126, if there are no additional input/output data ports, then the process may continue to block 130. In process block 130, the requesting node may then be further configured to broadcast its stored offsets with its neighboring nodes to all other nodes in the network 22. Each node in the network 22 may then retain the timer offsets discovered by other nodes in the network 22. In one embodiment, as illustrated in FIG. 5, each node 30*a-h* may maintain an offset table 70 in memory that represents the offsets that it has computed on its own as well as any offsets that it has received from other nodes.

The benefit of the offset table 70 as illustrated in FIG. 5, is that a node may further compute or calculate a clock offset between itself and any other node on the network 22. As shown in FIG. 6, this can be done by summing the individual offsets of node segments stored in its offset table 70 along a particular communication path. For instance, referring to FIGS. 2 and 6, if node 30*a* desires to know the timing offset between node 30*a* and 30*g* (along path 34), the node will use the offsets computed and received between the communication links of 30*a*-30*b*, 30*b*-30*c*, and 30*c*-30*g*.

Moreover, as shown in FIG. 5, as offsets are periodically recalculated and re-broadcast within the network 22, the nodes 30*a-h* may be configured to infer or determine an acceleration or drift rate of remote clocks over time. The acceleration or drift rate may be computed by determining the difference between computed or received offsets over the difference in time between synchronization dialogs. Using inferred acceleration and drifts of clocks can improve accuracy between the periodic synchronization steps. It also allows the system to use less accurate crystals or ceramic resonators to reduce costs. It further allows longer periods between synchronization dialogs.

What has been described is a system and method for time synchronizing nodes in a switch fabric network for a vehicle. A synchronization request message is transmitted from a requesting node to a neighboring node. At the time the synchronization request message is sent, the requesting node will store a unique message identification associated with the request message as well as a timestamp that is associated with the time that the synchronization request message was transmitted by the requesting node. A neighboring node will receive the synchronization request message and store the message identification in the request message as well as a timestamp associated with the time that the synchronization request message was received by the neighboring node.

Thereafter, the neighboring node will transmit to the requesting node a synchronization response message that includes the message identification and the timestamp associated with the time that the synchronization request message was received by the neighboring node. The requesting node will then calculate a timer offset value that is based on the timestamp that the synchronization request message left the requesting node and the timestamp that the synchronization request message was received by the neighboring node. The timer offset values may then be shared with other nodes in the network so that a summed offset may be used to transmit network messages across a plurality of nodes. The above description of the present invention is intended to be exemplary only and is not intended to limit the scope of any patent issuing from this application. The present invention is intended to be limited only by the scope and spirit of the following claims.

What is claimed is:

1. A method for time synchronizing nodes in a switch fabric of a vehicle communication network, the nodes in the switch fabric joined by at least one communication link for transmission of data packets therebetween, the method comprising the steps of:

transmitting a synchronization request message from a first node to a second node, the synchronization request message including a message identification;

storing, at the first node, a first timestamp associated with the transmission of the synchronization request message;

receiving the synchronization request message at the second node from the first node, storing, at the second node, a second timestamp associated with the reception of the synchronization request message;

transmitting a synchronization response message from the second node to the first node, the synchronization response message including the message identification and the second timestamp;

computing an onset in the first node based on the first timestamp and the second timestamp; and storing the offset in the first node for subsequent use in time synchronizing data packets transmitted by the first node to other nodes in the switch fabric.

2. The method in claim 1, wherein the synchronization request message further includes an identification of the first node.

3. The method in claim 1 further comprising the step of determining whether another offset needs to be computed by the first node that is associated with a third node.

4. The method in claim 1 further comprising the step of broadcasting the computed offset from the first node to other nodes in the switch fabric.

5. The method in claim 1, wherein the step of storing the offset includes storing the offset in an offset table, the offset table including a listing of a plurality of offsets of different communication segments between nodes in the switch fabric.

6. The method in claim 1 further comprising the step of receiving an offset at the first node from a third node in the switch fabric, the offset received from the third node being associated with a communication link between the third node and a fourth node.

7. The method in claim 6 further comprising the step of determining a drift rate associated with the third node based on the offset received from the third node.

8. The method in claim 1 wherein the recited steps are performed during a first time and a second time to compute a first offset and a second offset, the method further comprising the step of determining a drift rate based on the first and second offsets and the first and second times.

9. A method for time synchronizing a switch fabric of a vehicle communication network, the switch fabric having at least a requesting node and a neighboring node, the requesting node and the neighboring node joined by a communication link for transmission of data packets therebetween, the method comprising the steps of:

transmitting from the requesting node a synchronization request message to the neighboring node and storing in the requesting node a first timestamp associated with the transmission of the synchronization request message, the synchronization request message including at least a message identification;

receiving the synchronization request message at the neighboring node and storing the message identification and a second timestamp associated with the reception of the synchronization request message;

transmitting from the neighboring node a synchronization response message to the requesting node, the synchronization request message including the message identification and the second timestamp;

computing an offset in the requesting node based on the first timestamp and the second timestamp.

10. The method in claim 9 further comprising the step of storing the offset in the requesting node for subsequent use in time synchronizing data packets transmitted by the requesting node to another node along a communication path that includes the neighboring node.

11. The method in claim 9 wherein the synchronization request message further includes an identification of the requesting node.

12. The method in claim 9 further comprising the step of determining whether another offset needs to be computed by the requesting node that is associated with a second neighboring node.

13. The method in claim 9 wherein the switch fabric includes a remote node, the method further comprising the step of transmitting the computed offset from the requesting node to the remote node in the switch fabric.

14. The method in claim 9 further comprising the step of broadcasting the computed offset to other nodes in the switch fabric.

15. The method in claim 10, wherein the step of storing the offset in the requesting node includes storing the offset in an offset table, the offset table including a listing of a plurality of offsets of different communication segments between different nodes in the switch fabric.

16. The method in claim 9, wherein the switch fabric includes a remote node, the method further comprising the step of receiving an offset at the requesting node from the remote node.

17. The method in claim 16 further comprising the step of determining in a requesting node a drift rate associated with the remote node based on the offset received from the remote node.

18. The method in claim 9 wherein the recited steps are performed during a first time and a second time to compute a first offset and a second offset, the method further comprising the step of determining a drift rate based on the first and second offsets and the first and second times.

19. A vehicle network comprising:

a plurality of nodes joined by at least one communication link for transmission of data therebetween;

at least one node of the plurality of nodes including a processor, a memory, and a clock, the memory being adapted to store a timestamp associated with the time that a synchronization request message is transmitted and being adapted to store a timer offset associated with a communication link between the node and at least one other node of the plurality of nodes;

and a transceiver disposed within the node, the transceiver being adapted to transmit the synchronization request message to the other node and being adapted to receive a synchronization response message from the other node;

wherein the synchronization request message includes a message identification and the synchronization response message includes the message identification and a timestamp associated with a time that the synchronization request message is received by the other node; wherein the processor is operable to compute the timer offset based on the timestamp in the synchronization response message.

20. The vehicle network in claim 19, wherein the other node is configured to store a timestamp associated with a time that the synchronization response message is transmitted from the other node.

21. The vehicle network in claim 19, wherein the transceiver is further adapted to transmit the timer offset 22. The vehicle network in claim 19, wherein the transceiver is further adapted to receive at least one timer offset.

* * * * *

UNITED STATES PATENT AND TRADEMARK OFFICE
CERTIFICATE OF CORRECTION

PATENT NO. : 7,623,552 B2  Page 1 of 1
APPLICATION NO. : 11/016139
DATED : November 24, 2009
INVENTOR(S) : Jordan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1329 days.

Signed and Sealed this

Twenty-sixth Day of October, 2010

David J. Kappos
*Director of the United States Patent and Trademark Office*